(12) United States Patent
Pfeilschifter et al.

(10) Patent No.: US 10,763,690 B2
(45) Date of Patent: Sep. 1, 2020

(54) VEHICLE-SIDE CHARGING CIRCUIT FOR A VEHICLE WITH ELECTRIC DRIVE, AND METHOD FOR OPERATING A VEHICLE-SIDE CURRENT CONVERTER, AND USE OF AT LEAST ONE WINDING OF A VEHICLE-SIDE ELECTRIC MACHINE FOR INTERMEDIATE STORAGECTRICAL MACHINE FOR BUFFER

(71) Applicant: Continental Automotive GmbH, Hannover (DE)

(72) Inventors: Franz Pfeilschifter, Regensburg (DE); Klaus Muehlbauer, Friedenfels (DE); Martin Spornraft, Rottenburg (DE); Matthias Toens, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/573,392

(22) PCT Filed: May 4, 2016

(86) PCT No.: PCT/EP2016/060019
§ 371 (c)(1),
(2) Date: Nov. 10, 2017

(87) PCT Pub. No.: WO2016/180707
PCT Pub. Date: Nov. 17, 2016

(65) Prior Publication Data
US 2018/0131220 A1 May 10, 2018

(30) Foreign Application Priority Data
May 12, 2015 (DE) .................. 10 2015 208 747

(51) Int. Cl.
*H02J 7/14* (2006.01)
*H02J 7/00* (2006.01)
(Continued)

(52) U.S. Cl.
CPC .............. *H02J 7/14* (2013.01); *B60L 15/007* (2013.01); *B60L 50/13* (2019.02); *B60L 53/14* (2019.02);
(Continued)

(58) Field of Classification Search
USPC ........................................ 320/109
See application file for complete search history.

(56) References Cited

U.S. PATENT DOCUMENTS

2010/0096926 A1 4/2010 King et al.
2011/0215641 A1* 9/2011 Peterson ............... H01H 11/00
307/23
(Continued)

FOREIGN PATENT DOCUMENTS

CN 104065157 A 9/2014
DE 102009044281 A1 4/2010
(Continued)

OTHER PUBLICATIONS

ISR dated Jul. 21, 2016 of corresponding International patent application PCT/EP2016/060019.
(Continued)

*Primary Examiner* — Robert Grant

(57) ABSTRACT

A vehicle-side charging circuit for a vehicle with electric drive. The charging circuit comprises an AC connector, a controlled rectifier which is connected to the AC connector, an electric machine with at least one winding, a current converter which is connected to the electric machine, and an energy-storage-device connector. The at least one winding of the electric machine is coupled in series between the (Continued)

rectifier and the current converter. In an inverter mode the current converter is fed from the energy-storage device, and in a charging mode the current converter is from an external energy source via at least one series-connected winding of the electric machine and charges the electrical energy-storage device.

10 Claims, 1 Drawing Sheet

(51) Int. Cl.
  *H02M 3/158* (2006.01)
  *B60L 55/00* (2019.01)
  *B60L 53/14* (2019.01)
  *B60L 53/24* (2019.01)
  *B60L 50/13* (2019.01)
  *B60L 15/00* (2006.01)

(52) U.S. Cl.
  CPC .............. *B60L 53/24* (2019.02); *B60L 55/00* (2019.02); *H02J 7/00* (2013.01); *H02M 3/1584* (2013.01); *B60L 2220/54* (2013.01); *Y02E 60/721* (2013.01); *Y02T 10/641* (2013.01); *Y02T 10/70* (2013.01); *Y02T 10/7005* (2013.01); *Y02T 10/7072* (2013.01); *Y02T 10/7077* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| 2011/0316461 A1 | 12/2011 | Rippel |
| 2013/0234675 A1* | 9/2013 | King .................. B60L 11/1814 320/163 |
| 2014/0042807 A1 | 2/2014 | Bouchez et al. |

FOREIGN PATENT DOCUMENTS

| DE | 102011016532 A1 | 6/2012 |
| WO | 2011/063006 A1 | 5/2011 |
| WO | 2010096926 A1 | 5/2011 |

OTHER PUBLICATIONS

DE Office Action dated Feb. 15, 2016 of corresponding German patent application No. 10 2015 208 747.6.

Murat Yilmaz et al: "Review of integrated charging methods for plug-in electric and hybrid vehicles", Vehicular Electronics and Safety (ICVES), 2012 IEEE International Conference on, IEEE, Jul. 24, 2012, pp. 346-351, XP032231111, DOI: 10.1109/ICVES.2012.6294276, the whole document.

Pellegrino G. et al.: "An Integral Battery Charger with Power Factor Correction for Electric Scooter", Electric Machines and Drives conference, IEMDC 09, IEEE International, IEEE, Piscataway, NJ, USA, May 3, 2009, pp. 661-668, XP031475844, ISBN 978-1-4244-4251-5, Figure 1.

Chinese First Office Action dated Nov. 27, 2019 for corresponding Chinese Application No. 201680027236.1.

* cited by examiner

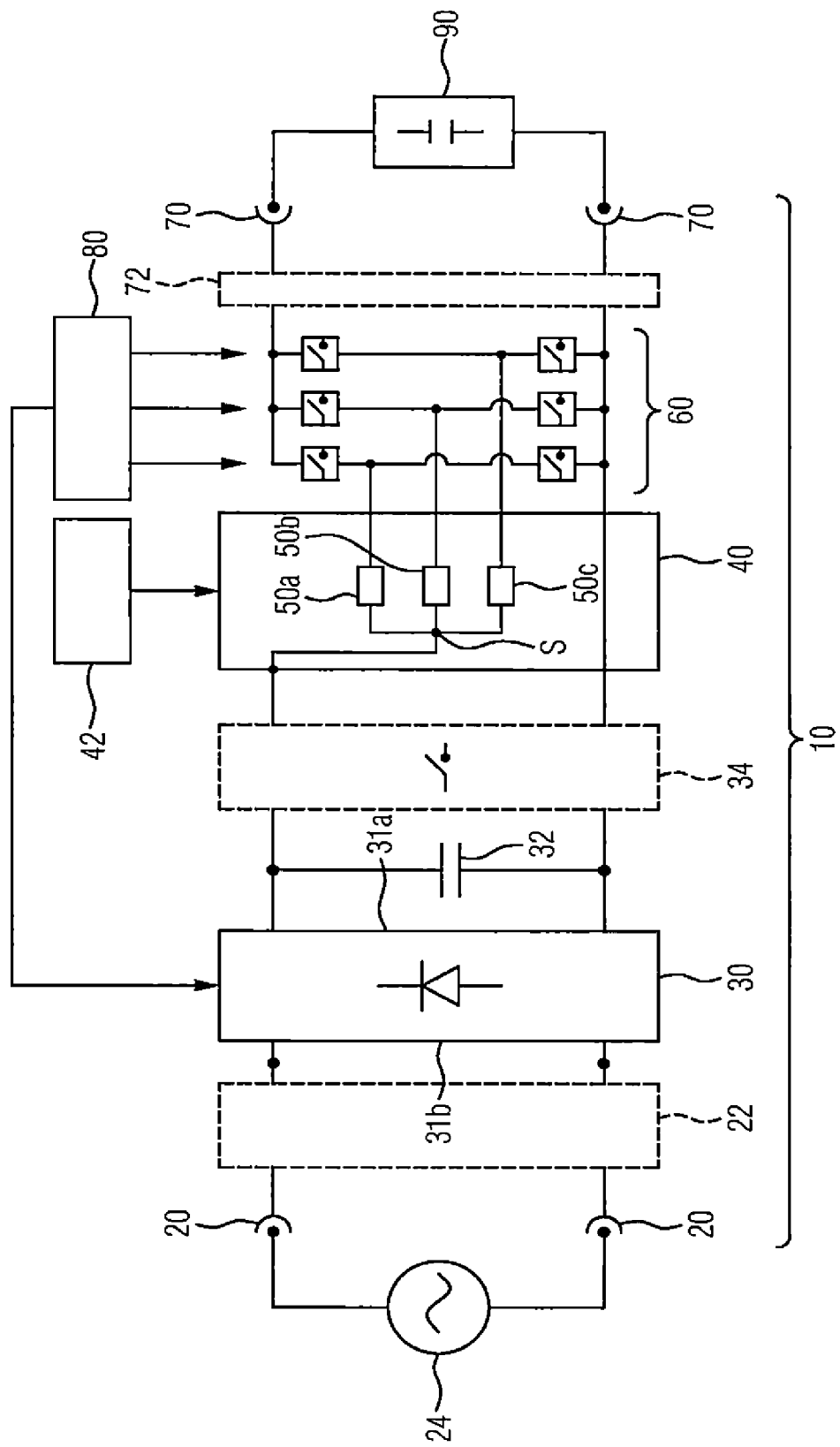

VEHICLE-SIDE CHARGING CIRCUIT FOR A VEHICLE WITH ELECTRIC DRIVE, AND METHOD FOR OPERATING A VEHICLE-SIDE CURRENT CONVERTER, AND USE OF AT LEAST ONE WINDING OF A VEHICLE-SIDE ELECTRIC MACHINE FOR INTERMEDIATE STORAGECTRICAL MACHINE FOR BUFFER

BACKGROUND

Vehicles with electric drive exhibit electrical energy-storage devices, for instance storage batteries, which can be charged by means of stationary supply networks. The storage batteries make energy available for the electric drive which generate energy for the traction of the vehicle in the case of electric vehicles, on its own, and, in the case of hybrid vehicles, in combination with an internal-combustion engine. For instance, in the case of parallel hybrid vehicles the internal-combustion engine generates kinetic energy which is transmitted to wheels of the vehicle, whereas in the case of serial hybrid vehicles the internal-combustion engine generates, via an electric machine, electrical energy which is utilized by the electric drive. Furthermore, storage batteries make energy available for ancillary units which may include, inter alia, electric machines or may also include, for instance, resistive loads such as heating elements.

For the purpose of charging a vehicle-side electrical energy-storage device, the latter is connected to a stationary supply network via a charging circuit. In the following, a vehicle-side charging circuit is described with which the charging process can be carried out. There are further described a method and a use of at least one winding of a vehicle-side electric machine, with which the charging process can be realized.

BRIEF SUMMARY

With the subject-matters of the independent claims, vehicle-side electrical energy-storage devices can be charged.

The invention provides that the current converter of a vehicle-side electric machine is employed, on the one hand, as an inverter, in order to generate a triggering signal (in particular, a triggering current such as a three-phase signal), and the same current converter of the vehicle-side electric machine is used in a charging circuit in which the at least one winding of the electric machine is used as an intermediate storage device in the course of a DC/DC transformation (that is to say, as a boost inductor). The current converter is therefore employed for two functions: on the one hand, as an inverter (for operating an electric machine) and, on the other hand, as a DC transformer (for charging an electrical energy-storage device). The at least one winding of the electric machine is also given two functions: on the one hand, the conventional function for controlling or generating a magnetic field, in order to be able to operate the electric machine as such (drive or generator), and, on the other hand, the function as boost inductor in a DC/DC transformer. The at least one winding of the electric machine stores energy in this case as a magnetic field, according to the mode of action of an inductor. The energy is fed as electrical energy into the at least one winding of the electric machine and is output from said machine again as electrical energy. By virtue of the function of the at least one winding of the electric machine, it is possible to feed in electrical energy by means of an AC connector. An AC voltage which is made available to the vehicle at the AC connector is firstly rectified on the vehicle side and then made available (preferentially smoothed) to the at least one winding which (in this function) operates as an inductor of a DC/DC transformer.

The additional function of the electric machine and of the current converter or inverter of the electric machine for DC/DC transformation makes possible a particularly simple configuration of the externally necessary components which are required for coupling to an external or stationary electrical supply network.

Contrary to the usual nomenclature, only one group of relevant switching elements will be designated as a current converter, whereas energy-storage devices, such as capacitors or inductors, which are required for realizing a current-converter function—for instance, for realizing a DC/DC transformation—are listed separately. This distinction is necessary, since the devices and methods proposed herein provide that the switching elements of an inverter, which as a stand-alone component triggers an electric machine, together with at least one winding of an electric machine, which serves as boost inductor, realize a DC/DC transformer (for charging an electrical energy-storage device).

A vehicle-side charging circuit is described for a vehicle with electric drive. By way of vehicles with electric drive, pure electric vehicles and hybrid vehicles, for instance, enter into consideration, in which case hybrid vehicles exhibit, for example, an internal-combustion engine in addition to the electric drive. The charging circuit serves for charging a vehicle-side electrical energy-storage device, which may be a traction battery or an on-board power-supply battery, for instance a high-voltage traction battery with a nominal voltage>80 volts (typically >320 volts or >360 V ... 400 V) or a low-voltage battery with a nominal voltage of <60 volts (typically about 12 V, 14 V, 24 V, 42 V or 48 volts).

The charging circuit further includes an AC connector. The latter may be multi-phase, for instance three-phase, but is preferentially of single-phase construction. The AC connector is designed for a nominal voltage which corresponds to that of a supply network, for example 110 V, 120 V, 220 V, 230 V or 240 V at a frequency of, for example, 50 Hz or 60 Hz. The AC connector is preferentially a plug-in contact and may, in particular, be designed in accordance with a standard according to IEC/TR 60083 or IECEE CEE-7, for instance in accordance with CEE 7/4. The AC connector is furthermore preferentially recessed in an outer skin of the vehicle, in particular within a hollow, and may be provided with a flap which covers the hollow and/or the AC connector. A further embodiment provides that the AC connector is contactless and includes a secondary coil which is configured for inductive absorption of energy (and has been set up for excitation by means of an external primary coil).

Furthermore, the charging circuit exhibits a rectifier which is connected to the AC connector directly or indirectly (for instance, via an EMC filter). The rectifier has an AC side, to which the AC connector is connected, and exhibits a DC side on which the rectified voltage arises. The rectifier is preferentially a full-wave rectifier, for instance a thyristor circuit, transistor circuit or diode circuit which forms a rectifier bridge. The rectifier is a (fully) controlled rectifier but may also be configured as a semi-controlled rectifier. As a (fully) controlled rectifier, it exhibits a rectifier bridge which is formed with thyristors. As a semi-controlled rectifier, the latter exhibits thyristors and diodes, with one thyristor (or one transistor) and one diode forming one arm of the rectifier in each instance. A "controlled rectifier" is understood to mean a fully controlled or a semi-controlled rectifier, unless otherwise stated. As mentioned, transistors—for instance, field-effect transistors such as MOSFETs or even IGBTs—may also be used instead of thyristors.

In addition, the charging circuit exhibits, as mentioned, an electric machine. The latter is equipped with at least one winding, preferentially with several windings, for example with an integral multiple of three. In one configuration, three windings are provided. The windings are, in particular, stator windings. The electric machine may be configured as an externally or permanently excited electric machine. The electric machine may be designed as an asynchronous machine or as a synchronous machine and may be, for example, a dynamo. For example, the electric machine may be an externally excited synchronous machine. In the case of several (stator) windings, these may have been connected up as a star configuration and connected to one another at a neutral point. One end of the windings is formed by the neutral point, whereas the other end of the windings is formed by winding connectors. The electric machine is indirectly or directly connected to the rectifier, in particular to the direct-current side thereof. In this case, the neutral point of the electric machine is preferentially connected to the rectifier indirectly (for instance, via a disconnecting switch) or directly. If the windings have been connected up in triangular configuration, one end of a winding (and consequently also one end of a series connection of two further windings) is connected to the rectifier.

The charging circuit exhibits a current converter. The latter is preferentially connected to the electric machine. The current converter is, in particular, an inverter circuit. The current converter is preferably configured as a B6C bridge. The current converter is configured to operate in two different modes (inverter mode, charging mode). On the one hand, for the purpose of triggering the electric machine the current converter can operate as a motor, as a generator, or in both of these functions, so that said machine is operated as an electric motor and/or as a generator. On the other hand, the current converter may serve for transmitting power to an energy-storage-device connector (in which case this may be designated as the charging mode), in which case the at least one winding of the electric machine transmits the power, and the current converter serves as switching unit of a transformer, in particular as switching unit of a DC/DC transformer. The current converter can transmit or transform electrical energy in one direction if said current converter is being operated in the charging mode or if the electric machine is operating as a generator. In both of these modes, electrical energy is supplied from the current converter to an energy-storage-device connector or to an energy-storage device coupled thereto. The current converter is furthermore preferably configured to operate in the opposite direction, in particular for the purpose of transmitting electrical energy from the energy-storage-device connector, or from the energy-storage device coupled thereto, to the electric machine. The current converter is therefore preferentially designed for different transformation directions (that is to say, it is a bidirectional transformer). In addition, the current converter is therefore preferentially configured for different modes—that is to say, for operation as a DC/DC transformer (together with the at least one winding of the electric machine) and for operation of the electric machine as a generator and/or as an electric motor.

As mentioned, the charging circuit is provided with an energy-storage-device connector. The latter has been set up for coupling an electrical energy-storage device. The charging circuit outputs charging current to the energy-storage device via the energy-storage-device connector. The energy-storage device may be implemented as presented above. The energy-storage device is, in particular, an electrochemical or an electrostatic storage device, for instance a storage battery or a capacitor or a combination thereof. The storage battery may be a lithium-based storage device or a lead/acid storage battery or even a storage device with nickel cells, in particular nickel/metal-hydride cells. The energy-storage-device connector is, in particular, a plug-in connector or a screw connector. The energy-storage-device connector is designed for operating voltages of, preferentially, at least 60 V, in particular at least 320 V, 360 V or 400 V.

The energy-storage-device connector may be directly connected to the current converter or to the supply-voltage rails thereof. A matching DC/DC transformer is preferentially located between the energy-storage-device connector and the current converter. The matching DC/DC transformer preferentially connects the current converter to the energy-storage-device connector. The matching DC/DC transformer can be triggered by the control device or by another control unit which is triggered by the control device or by a unit superordinate thereto. The matching DC/DC transformer is, for example, a step-up transformer. With the matching transformer, the voltage delivered by the current converter can be adapted (preferentially upward) to an operating voltage of the energy-storage device or of the energy-storage-device connector.

The invention provides that the at least one winding of the electric machine is connected in series between the rectifier and the current converter. As a result, the at least one winding can operate as a boost inductor. In particular, a neutral point of several windings of the electric machine is connected directly or indirectly (for instance, via a disconnecting switch) to the rectifier (or to the direct-current side thereof). The ends of the windings opposed to the neutral point that is to say, the winding connectors—are connected to the current converter. The current converter is preferentially of multi-phase—in particular, three-phase—configuration, preferably as a full bridge. For each of the winding connectors the current converter exhibits a connector and an associated arm of the bridge circuit which is formed by switching elements of the current converter. If the electric machine is of three-phase configuration, the current converter is also of three-phase configuration.

The vehicle-side charging circuit is may be equipped with a control device. The latter is connected in triggering manner to the current converter, to the rectifier, or to both. The control device is configured for selective triggering according to an inverter mode and according to a charging mode. In a first state, the control device has been set up to operate the current converter in the inverter mode. In a second state, the control device has been set up to operate the current converter in a charging mode. The control device can assume both states, but not simultaneously. The control device has been set up to be operated selectively in one of the two modes. The states or the modes are mutually exclusive. The control device may furthermore be configured to trigger the rectifier in the charging mode, since said rectifier is designed to be controllable (or semi-controllable). In this case, the control device may be configured to trigger the rectifier in accordance with a pulse-width-modulation or phase-control method. The control device may furthermore have been set up to receive data relating to the state (in particular, the charging state, the terminal voltage, the current, the temperature or other operating parameters) of an electrical energy-storage device which can be coupled to the energy-storage-device connector. Measuring devices—for instance, voltage sensors and/or current sensors—may be provided on the energy-storage-device connector, in order to ascertain the state of the coupled energy-storage device. These measuring devices are coupled to inputs of the control device. The control device can thereby control, regulate or monitor the charging current which is output at the energy-storage-device connector.

In particular, the control device may be configured (in the charging mode) to trigger the rectifier (and, in particular, the current converter, for example the B6C bridge thereof) in such a manner that a power factor, which corresponds to certain criteria, arises at the AC connector. These criteria may consist in that the power factor is as large as possible, lies within a predetermined interval, or does not exceed a predetermined limit. Hence the rectifier (and, where appropriate, the current converter) and also the control device together realize a power-factor correction. Particularly in the case where the current converter is being used within this function, the power factor can be adjusted for the purpose of obtaining an optimized power-factor correction, resulting in a high efficiency.

In the inverter mode, the control device has been set up to trigger the current converter, to transform the voltage applied to the energy-storage-device connector into a triggering signal with which the electric machine can be operated. In this case, the triggering signal is a current signal with which the electric machine is excited. In particular, the triggering signal is a three-phase current with which a rotating field can be generated in the electric machine.

In the charging mode, the control device has been set up to trigger the current converter, to transform the voltage that is output by the rectifier to the current converter via the at least one winding into a charging signal which is output to the energy-storage-device connector. In other words, in the charging mode the control device has been set up to trigger the current converter, to transform the voltage that is applied to at least one connector, facing away from the rectifier, of the at least one winding (for instance, to the winding connectors) into a charging signal, which to the energy-storage-device connector to transform into a charging signal, which can be output to the energy-storage-device connector for the purpose of charging an energy-storage device coupled thereto. In this mode, the control device is operating as a control device of a transformer, the transformer including the at least one winding of the electric machine (as a boost inductor or buck inductor) and the current converter.

According to one embodiment, the energy-storage device does not count as part of the charging circuit and is merely mentioned in order to clarify the properties of the charging circuit. As mentioned, only the relevant group of switching elements (for instance, the B6C bridge) is regarded as a current converter, whereas the boost inductor is realized by the electric machine or by the one or more windings thereof. The current converter (or the relevant switching elements) and the boost inductor represented in this way together realize a transformer function, in particular a step-up-transformer function or a DC-voltage-transformer function. At least one further inductor may be provided which is connected up to the at least one winding of the electric machine in series or in parallel, or in the charging mode is connected up in series or in parallel, in order to obtain desired inductance values. This further inductor may be implemented as a separate, discrete component that is to say, as a coil as an addition to the at least one winding of the electric machine.

Furthermore, an EMC filter may be connected up between the rectifier and the AC connector. The EMC filter connects the rectifier to the AC connector. The EMC filter is coupled, in particular, to the AC side of the rectifier. The abbreviation EMC here stands for "electromagnetic compatibility". The EMC filter serves for reducing high-frequency components such as arise in the course of switching operations. The EMC filter is employed, in particular, when the rectifier is fully controlled or at least semi-controlled. The EMC filter has the transmission characteristic of a low-pass filter, the fundamental-frequency components of approximately 50 Hz or 60 Hz passing through the EMC filter substantially unattenuated.

A smoothing capacitor may be connected up in parallel between the rectifier and the electric machine (or one or more windings thereof). The smoothing capacitor is, for example, connected up parallel to the rectifier (or to the direct-current side thereof). The smoothing capacitor is configured to smooth the pulsed DC voltage generated by the rectifier.

A disconnecting switch may be connected up in series between the rectifier (or one or more windings thereof) and the electric machine. The disconnecting switch may be located, in particular, in the ground rail, in which case a series connection of the disconnecting switch in the positive supply rail is also possible. The disconnecting switch may be electromechanical or may be an electronic switch.

The electric machine may be equipped with a locking actuator. The locking actuator exhibits a locking bar which can selectively arrest or release the electric machine in controlled manner. The locking bar is configured, in particular, to engage with a rotor of the electric machine. As a result, movements of the electric machine are prevented during the charging mode or in a parking mode in which the vehicle does not move. Particularly in the case where a permanently excited electric machine is used as electric machine, the control device may be configured to trigger alternately those switching elements of the current converter which are connected to different windings, preferentially at an alternating frequency of less than 1 Hz or 1000 Hz. In a particularly preferred embodiment, the control device is configured to switch a different switching element or switching elements assigned to different windings in the course of each switching operation of the current converter during the charging mode. The switching elements assigned to different windings are preferentially connected up in series, with the switching elements of the first winding being used again after the switching elements of the last winding.

The electric machine may be a traction machine or a starter/generator or a generator or a starter or starter motor of the vehicle. The electric machine is preferentially a motor of an ancillary unit of the vehicle, in particular of an air-conditioning compressor (or even of a compressor acting on the inlet of an internal-combustion engine—that is to say, a compressor of a supercharging device of an internal-combustion engine).

Furthermore, a method is described for operating a vehicle-side current converter to which an electric machine and an electrical energy-storage device are coupled. The current converter, the electric machine and the electrical energy-storage device may be configured as represented here on the basis of the charging circuit. The method provides two modes (that is to say, an inverter mode and a charging mode) for the current converter, which are preferentially mutually exclusive. These modes may be regarded as method steps of different types, with method steps of different types following one another indirectly or directly.

In an inverter mode, the current converter is fed from the energy-storage device. In this mode, the current converter generates a triggering signal with which the electric machine is operated. A triggering current or a triggering voltage with which the electric machine is excited is designated as a triggering signal. The triggering signal is therefore a power signal. In the inverter mode, the current converter in the sense of an inverter transforms the voltage applied to the energy-storage-device connector or to the energy-storage device (or the current delivered by the energy-storage device) in accordance with an engine-control default into a triggering signal, in particular into a three-phase current with which the electric machine is fed. The engine-control default specifies, for example, a set torque and/or a set engine speed. Furthermore, in the case of an externally excited electric machine an excitation signal can be generated, with which a rotor winding of the electric machine is fed. The excitation signal and, in particular, the triggering signal are preferentially generated by the control device.

In a charging mode, the current converter is fed via at least one series-connected winding of the electric machine from an external source of electrical energy, in particular via a rectifier which is preferentially controllable. In this case, the at least one series-connected winding corresponds to the winding elucidated with reference to the charging circuit. The rectifier is accommodated on the vehicle side. The external source of electrical energy is outside the vehicle in which the current converter or the charging circuit is accommodated. The (vehicle-side) rectifier receives the energy from the external source of electrical energy via a vehicle-side AC connector. The external source of energy is, in particular, an AC source and is coupled via the (vehicle-side) AC connector. The external source of energy is, in particular, a stationary source of electrical energy, for instance a charging station or an electrical public or private supply network, but may also be a further vehicle or the storage battery thereof. The external source of energy may be coupled to the AC connector by means of a cable. A wireless transmission technology may also be provided, by means of which energy is transmitted from the external source of energy to the AC connector, for instance an inductive transmission, in which case the AC connector is designed to be contactless as a secondary coil which transforms an alternating magnetic field of a primary coil (of the charging station, of the vehicle, or coupled to the supply network) into electrical energy. Instead of the definition that in a charging mode the current converter is fed via at least one series-connected winding of the electric machine from an external source of energy via an AC connector, there may also be provision that in the charging mode the current converter is fed via at least one series-connected winding of the electric machine via an AC connector. A vehicle-side AC connector is therefore used for the vehicle-side feeding. Via this AC connector, in the charging mode the charging circuit (or the rectifier or the current converter) is supplied with electrical energy. This enables a simplified implementation of the connection between an external AC source and the vehicle, since no further electronics are required for connection, but a simple cable suffices.

In the charging mode, the current converter generates a charging signal which is supplied to the electrical energy-storage device. The charge signal is, in particular, a charging current or a charging voltage, by means of which the energy-storage device is charged. In the charging mode, the current converter, together with the at least one winding, serves as transformer, in order to be able to transmit the electrical energy at the AC voltage connector to the storage battery in controlled manner. The transformer formed by the current converter (that is to say, by the switching elements of the inverter) and by the at least one winding is furthermore controllable and consequently has been set up to adjust the power (in particular, the current and/or the voltage) that is output to the storage battery. As a result, the charging signal (in particular, the charging current and/or the charging voltage) can be adapted to the operating state of the battery and, in particular, to the charging capacity thereof. In addition, the voltage state of the transformer that is formed by the current converter and by the at least one winding can be adapted. As a result, the voltage state of the voltage that is output at the rectifier in the direction of the storage battery can be adapted to an operating voltage (or set operating voltage) of the storage battery. In this case, the current converter is, for instance, pulse-width-modulated or triggered by means of phase angle. In this case, the control device can generate the modulation signals or phase-angle signals and thereby realize the triggering function. Reference is made to the functions of the control device mentioned herein.

In the charging mode, the at least one winding of the electric machine forms, together with the current converter, a transformer. In particular, these form together a step-up transformer or a DC/DC transformer. The at least one winding operates as a storage inductor, which may also be designated as a boost inductor. The transducer that is formed is, in particular, controllable. In this case, the current converter or the switching elements thereof exhibit(s) inputs with which the individual switching elements of the current converter can be triggered. As mentioned, the triggering comprises, for example, a pulse-width modulation or a phase-angle control. Furthermore, the rectifier can be controlled, in order to adjust the effective current or the voltage.

In the charging mode, a locking bar of a locking actuator preferentially locks the electric machine mechanically. In this case, the locking bar can engage with the rotor and thereby arrest it in controlled manner. This serves to ensure that the current flowing through the at least one winding in the charging mode does not lead to unintentional movement of the rotor. In the inverter mode, the locking bar does not lock the electric machine, or is in a retracted mode. As a result, in the inverter mode, when the windings of the electric machine generate a magnetic field for the purpose of generating torque, the rotor of the electric machine is able to rotate freely. In the inverter mode, energy can furthermore flow from the electric machine to the energy-storage-device connector when the electric machine is in the generator mode. The current converter is therefore configured to be bidirectional and is configured, in particular, to be able to transmit or transform power bidirectionally in the inverter mode.

Finally, the use is described of at least one winding of a vehicle-side electric machine for the purpose of electrical intermediate storage of energy within the scope of a DC voltage transformation. The DC voltage transformation in this case is, in particular, a step-up transformation. By means of the DC voltage transformation, electrical energy is transmitted in controlled manner via a vehicle-side AC connector (in particular, pertaining to an external source of electrical energy) to a vehicle-side electrical energy-storage device. The electrical intermediate storage provides that the at least one winding receives and outputs energy periodically in order to carry out a current transformation (in particular, a boost). By means of the DC voltage transformation, in particular the rectified current of an external electrical AC source is transmitted to the vehicle-side energy-storage device.

Furthermore, a current converter of the electric machine, which is assigned to the latter as an inverter, is likewise used for power transformation. In this case, the current converter and the at least one winding are used together as a controllable DC voltage transformer. The current converter together with the at least one winding of the electric machine serve for transforming a rectified alternating current into a charging current of an electrical energy-storage device. In an inverter mode, the current converter is used as an inverter in order to supply the electric machine with a triggering current, whereas the same current converter is used together with the winding of the at least one electric machine as a step-up transformer. Within the scope of the use of the at least one winding of the electric machine for intermediate storage of energy, a rectifier converts the current that is fed in via a vehicle-side AC connector into direct current, the at least one winding and the current converter receiving this direct current for the purpose of (controlled) transformation in order to output the transformed current to an electrical energy-storage device. The controllable rectifier furthermore adjusts the level of the (effective) DC voltage that is output by the rectifier and supplied to the electric machine. In particular, the controllable rectifier can be used for phase-angle control, for instance in order to adapt the rectified DC voltage to a set current or to adapt a set voltage at the energy-storage-device connector.

BRIEF DESCRIPTION OF THE DRAWINGS

FIG. 1 is an overview of a system that is suitable for elucidating the invention.

DETAILED DESCRIPTION

FIG. 1 shows a vehicle-side charging circuit 10 which via a (single-phase, where appropriate also three-phase) AC connector 20 is connected to an external electrical-energy source 24 which outputs alternating current. The source of electrical energy is outside the vehicle, for instance in the form of a charging station, and is therefore not a part of the charging circuit 10. Connected downstream of the AC connector 20 of the charging circuit 10 is an EMC filter 22. Connected downstream of the EMC filter 22 is, in turn, a rectifier 30. The rectifier 30 takes the form, in particular, of a rectifier circuit of diodes, thyristors or transistors (in particular, MOSFETs). The rectifier 30 may therefore be semi-controlled or may be implemented to be controllable, in particular controllable in accordance with a phase-angle control. A control device 80 is connected in triggering manner to the rectifier 30 which is implemented to be controllable or semi-controllable, the arrow between these two components representing the triggering direction.

The rectifier 30 is connected to the AC connector 20, preferentially, as represented, via an optional EMC filter 22. The optional EMC filter is represented by dashed lines, in which connection components represented by dashed lines are generally to be regarded as optional.

Connected downstream of the rectifier 30 is an optional smoothing capacitor 32. The smoothing capacitor 32 is located on a DC side 31a of the rectifier 30. Located on an AC side 31b of the rectifier 30, which (with respect to the rectifier 30) is located opposite the DC side 31a, is/are the AC connector 20 and, where appropriate, the optional EMC filter 22. The rectifier 30 connects the AC connector 20 (and, where appropriate, the optional EMC filter 22) to an electric machine 40.

An optional smoothing capacitor may be connected in parallel between the electric machine 40 and the rectifier 30. Furthermore, the electric machine 40 may be connected to the rectifier 30 or to the DC side 31a thereof via an optional disconnecting switch 34. The disconnecting switch 34 may be arranged, in particular, in the ground rail (the lower rail in FIG. 1), but may, alternatively or in combination with this, also be provided in the positive supply rail (the upper rail in FIG. 1).

The electric machine 40 and, in particular, the several windings 50a-c thereof are connected downstream of the rectifier 30 which is connected to the AC connector 20. The several windings 50a-c form a three-phase system and are connected up in star configuration. A locking actuator 42 is assigned to the electric machine 40 and has been set up to lock the rotor thereof. The mechanical action of the locking actuator 42 is represented by the arrow between the locking actuator 42 and the electric machine 40. The locking actuator 42 is triggered by the control device 80.

The windings 50a-c each exhibit an end, these ends of the windings 50a-c being connected to one another via a neutral point S. The rectifier 30 (in particular, the positive output thereof) is connected to the neutral point. The rectifier 30 is furthermore connected to a current converter 60, a negative output of the rectifier 30 being connected to the current converter 60 (or to the negative supply rail thereof). The outputs of the rectifier 30 correspond to the connectors on the DC side 31a of the rectifier 30. The windings 50a-c furthermore each exhibit an end that is opposed to the neutral point S (or to the rectifier 30). These ends of the windings 50a-c are connected to the current converter 60. The current converter 60 includes a B6C bridge (controlled by a control device 80). The current converter is consequently configured as a full bridge and is three-phase. For each of the three phases, two controllable semiconductor switches (represented as thyristors in FIG. 1) are provided. The semiconductor switches have a blocking direction and a forward direction. Furthermore, the semiconductor switches have a control input, so that the conduction state or switching state in the forward direction can be controlled. The control inputs are connected to the control device 80. The two semiconductor switches of each of the three phases are connected in series, an associated winding in particular, an end of the winding 50a-c that is opposed to the neutral point being coupled to the connecting point. The respective two series-connected semiconductor switches are coupled between the negative supply rail and a positive supply rail, and connect said rails. The two series-connected semiconductor switches are (at least in the inverter mode) never simultaneously in the "conducting" switching state. Each winding 50a-c is connected to the positive supply rail of the current converter 60 via a semiconductor switch and connected to the negative supply rail of the current converter 60 via a further semiconductor switch.

The current converter 60 is furthermore connected to an energy-storage-device connector 70. In particular, the two supply-voltage rails of the current converter 60 are connected to the energy-storage-device connector 70. The energy-storage-device connector 70 is a DC connector. An electrical energy-storage device 90, in particular a high-voltage storage battery, is coupled to the energy-storage-device connector 70. The energy-storage device 90 is not part of the charging circuit 10. With the exception of the external source of electrical energy, all the components represented (and also all the components described) are arranged on the vehicle side and are consequently intended to be arranged in a vehicle or to form part of an on-board vehicle network.

An optional matching DC/DC transformer 72 is represented in FIG. 1. Via this transformer the current converter 60 is connected to the energy-storage-device connector 70. The matching DC/DC transformer 72 is preferentially a step-up transformer. The matching DC/DC transformer 72 serves for adapting the voltage delivered by the current converter to an operating voltage of the energy-storage device 90. The matching DC/DC transformer 72 is represented as a part of the charging circuit 10. However, the matching DC/DC transformer 72 may also be regarded as a component of the energy-storage device, with which charging voltages can be adapted to set voltages of a cell stack of the energy-storage device.

The charging device 10 realizes a charging function, but components of the electric drive (in particular, the windings 50*a-c* of the electric machine 40, and the current converter 60 which serves as inverter) are used for this purpose. By reason of this dual use, the charging device 10 may also be designated as a (wired-up) electric drive with charging function. The windings 50*a-c* of the electric machine are, in particular, stator windings. In the case of externally excited electric machines, the excitation current has been switched off in the charging mode by reason of the triggering by means of the control device 80, and switched on in the inverter mode.

LIST OF REFERENCE SYMBOLS

10 vehicle-side charging circuit
20 AC connector
22 EMC filter
24 external electrical-energy source
30 Rectifier
32 smoothing capacitor
34 disconnecting switch
40 electric machine
42 locking actuator
50*a-c* at least one winding of the electric machine 40
60 current converter
70 energy-storage-device connector
72 matching DC/DC transformer
80 control device
90 electrical energy-storage device
S neutral point

The invention claimed is:

1. A vehicle-side charging circuit for a vehicle with electric drive, the charging circuit comprising:
an alternating current (AC) connector;
a controlled rectifier which is connected to the AC connector;
an electric machine with at least one winding;
a current converter which is connected to the electric machine, the at least one winding of the electric machine is coupled in series between the controlled rectifier and the current converter; and
an energy-storage-device connector;
wherein the electric machine includes a locking actuator having a locking bar which can selectively arrest or release a rotor of the electric machine in a controlled manner.

2. The vehicle-side charging circuit of claim 1, comprising a control device connected in triggering manner to the current converter, the control device operates the current converter in a first state in an inverter mode, and in a second state in a charging mode, wherein:
in the inverter mode, the control device triggers the current converter to transform a voltage applied to the energy-storage-device connector into a triggering signal with which the electric machine can be operated; and
in the charging mode, the control device triggers the current converter to transform a voltage outputted by the controlled rectifier to the current converter via the at least one winding into a charging signal which can be output to the energy-storage-device connector for charging an energy-storage device coupled thereto.

3. The vehicle-side charging circuit of claim 1, further comprising an electromagnetic compatibility (EMC) filter coupled between the controlled rectifier and the AC connector.

4. The vehicle-side charging circuit of claim 1, further comprising a smoothing capacitor connected in parallel between the controlled rectifier and the electric machine.

5. The vehicle-side charging circuit of claim 1, further comprising a disconnecting switch connected in series between the controlled rectifier and the electric machine.

6. A vehicle-side charging circuit for a vehicle with electric drive, the charging circuit comprising:
an alternating current (AC) connector;
a controlled rectifier connected to the AC connector;
an electric machine including at least one winding, the electric machine includes a locking actuator, the locking actuator includes a locking bar which selectively arrests or releases a rotor of the electric machine in a controlled manner;
a current converter connected to the electric machine, the at least one winding of the electric machine is coupled in series between the controlled rectifier and the current converter;
an energy-storage-device connector;
a control device connected in triggering manner to the current converter, the control device operates the current converter in a first state in an inverter mode, and in a second state in a charging mode, wherein:
in the inverter mode, the control device triggers the current converter to transform a voltage applied to the energy-storage-device connector into a triggering signal with which the electric machine can be operated, and
in the charging mode, the control device triggers the current converter to transform a voltage outputted by the controlled rectifier to the current converter via the at least one winding into a charging signal which can be output to the energy-storage-device connector for charging an energy-storage device coupled thereto;
an electromagnetic compatibility (EMC) filter coupled between the controlled rectifier and the AC connector;
a smoothing capacitor connected in parallel between the controlled rectifier and the electric machine; and
a disconnecting switch connected in series between the controlled rectifier and the electric machine.

7. The vehicle-side charging circuit of claim 6, wherein the electric machine is a traction machine or a starter/generator or a generator or a starter of the vehicle, or the electric machine is a motor of an ancillary unit of the vehicle.

8. A method for operating a vehicle-side current converter coupled to an electric machine and an electrical energy-storage device, the method comprising:
in an inverter mode:
feeding the current converter from the energy-storage device,
generating, at the current converter, a triggering signal causing the electric machine to operate; and
in a charging mode:

feeding the current converter via at least one series-connected winding of the electric machine from an external energy source via an AC circuit and via a controlled rectifier, and generating, at the current converter, a charging signal supplied to the electrical energy-storage device;

forming a power transformer with the at least one winding of the electric machine and the current converter, in which the at least one winding operates as a storage inductor;

wherein:

in the charging mode, mechanically locking the electric machine by way of a locking bar, and in the inverter mode, failing to lock the electric machine by way of the locking bar.

9. The method of claim 8, wherein the controller rectifier adjusts an effective current or a voltage.

10. A method for operating a vehicle-side current converter to which an electric machine and an electrical energy-storage device are coupled, wherein in an inverter mode:

the current converter is fed from the energy-storage device and generates a triggering signal with which the electric machine is operated; and in a charging mode:

the current converter is fed via at least one series-connected winding of the electric machine from an external energy source via an alternating current (AC) circuit and via a controlled rectifier and generates a charging signal which is supplied to the electrical energy-storage device, and the at least one winding of the electric machine together with the current converter form a power transformer in which the at least one winding operates as a storage inductor, the controlled rectifier is controlled in order to adjust an effective current or a voltage, the controlled rectifier is controlled to adjust an effective current or a voltage;

wherein in the charging mode a locking bar of a locking actuator mechanically locks the electric machine, and in the inverter mode the locking bar does not lock the electric machine.

* * * * *